United States Patent [19]

Messenger et al.

[11] Patent Number: 5,206,881
[45] Date of Patent: Apr. 27, 1993

[54] WIRELESS LOCAL AREA NETWORK

[75] Inventors: Steven Messenger; Tommy Tsoulogia, both of Scarborough, Canada

[73] Assignee: Telesystems SLW Inc., Don Mills, Canada

[21] Appl. No.: 868,696

[22] Filed: Apr. 15, 1992

[51] Int. Cl.$^5$ .............................................. H04B 9/00
[52] U.S. Cl. ........................................ 375/1; 380/48; 364/242.95; 340/825.07
[58] Field of Search .......... 375/1; 340/825.07, 825.52; 364/242.95; 380/46, 48; 370/100

[56] References Cited

U.S. PATENT DOCUMENTS

| | | | |
|---|---|---|---|
| 4,724,435 | 2/1988 | Moses et al. | 375/1 |
| 4,774,715 | 9/1988 | Messenger | 375/1 |
| 4,975,926 | 12/1990 | Knapp | 375/1 |
| 5,123,029 | 6/1992 | Bantz et al. | 375/1 |

*Primary Examiner*—David Cain
*Attorney, Agent, or Firm*—Mirek A. Waraksa

[57] ABSTRACT

In a wireless local area network in which data packets are spread spectrum encoded, method and apparatus are provided for determining phase values that synchronize noise codes at network stations with received data packets. A synchronizing packet is first transmitted from a source station to various network stations. Each network station performs a wide-range search for a phase value that synchronizes the noise code of the station with the synchronizing packet. Thereafter, each network station performs narrow-range searches for phase values synchronizing the noise code of the station with subsequently received network packets. The stations switch to the wide-range search mode whenever a synchronizing phase angle has not been detected for predetermined period of time and switch to a narrow-range search mode whenever a synchronizing phase angle is detected. In a polled local area network, polling packets generated by a base station serve as synchronizing packets, and the base station is adapted to perform only narrow-range searches. Packets with shorter synchronization headers can be used thereby improving data transfer rates.

23 Claims, 2 Drawing Sheets

WIRELESS LOCAL AREA NETWORK

FIELD OF THE INVENTION

The invention relates to local area networks involving spread spectrum transmission of data packets, and more specifically, to methods and apparatus for determining phase values that synchronize pseudorandom noise codes (referred to in this disclosure and appended claims as "PN codes") with network packets.

BACKGROUND OF THE INVENTION

It is known to form a wireless local area network in which data packets are direct sequence spread spectrum encoded and transmitted through air. Techniques for decoding such packets, and directed more specifically to the problem of synchronizing local PN codes with received data packets, are described, for example, in prior U.S. Pat. No. 4,774,715 to Messenger, one of the co-inventors of the present invention. The packets transmitted in such systems include a synchronization header that permits a receiving station to lock onto a received packet and then spread spectrum decode the data following the header. Without a synchronization header of adequate length, the data is apt not to be decoded in a proper manner.

One shortcoming associated with such prior systems relates to the length of the synchronization header and time required to synchronize to a received packet before data can be decoded. The size of the synchronization header ultimately limits data transfer rates. This is most significant where a communications channel is time-shared by a large number of users. A requirement for large synchronization headers can make such systems impractical for digitized voice transmission.

It is common in decoding spread spectrum transmissions to select different phase values for the PN code of a receiving station from a relatively exhaustive set of values. Such a set will correspond in size to the number of "chips" contained in the PN code. Phase-shifted PN codes corresponding to each of the phase values are produced and combined with incoming signals to determine a phase value that will synchronize the station's PN code with an intended communication. The strength of the test signals may be detected in a known manner to determine whether any selected phase value synchronizes the station's PN code with the received data. Thereafter, the data is simply decoded by combining the data with the PN code of the station adjusted to the synchronizing phase value.

One method of producing more rapid synchronization is to provide a measure of parallelism in the search for a synchronizing phase value. More specifically, sets of possible phase values may be simultaneously tested to determine whether any one of the phase values is appropriate for decoding the incoming signal. If repeated selection and testing of phase values is to be entirely eliminated, the required phase-shifting and combining circuitry must be duplicated until all practical phase values of the receiving station's PN code are simultaneously tested. Given the typical chip size of a PN code (in excess of 100 chips), providing parallel processing circuitry at various stations in a local area network would be exceptionally costly. Other rapid synchronizing techniques, including matched filters, are known, but these too are very costly

BRIEF SUMMARY OF THE INVENTION

In prior spread spectrum communication systems, designers have largely assumed that a synchronizing mechanism can be provided to achieve whatever rate of synchronization is required. The present invention, however, takes an overall system approach to providing faster synchronization to direct sequence spread spectrum encoded packets in a local area network. What the inventors have recognized is that receipt of a packet by various network stations tends to produce a measure of synchronization among the PN codes of the stations. This can be exploited, as described more fully below, to restrict the range of phase values which must be tested at any given network station to determine synchronizing values for decoding of subsequent network transmissions.

In one aspect, in a local area network comprising a plurality of stations each adapted to generate a PN code common to the stations, to transmit packets spread spectrum encoded with a PN code and to decode packets by combining them with the PN code, the invention provides a method of determining phase values that synchronize the PN code of a first network station with a data packet direct sequence spread spectrum encoded with the PN code by a second network station. The method involves transmitting from one of the network stations (not necessarily the relevant first or second station), through air, a synchronizing packet encoded with the PN code. The phase of the PN codes of the other stations are adjusted to phase values which synchronize each station's PN code with the synchronizing packet. The initial phase adjusting may involve conventional searching through a relatively exhaustive set of phase values (repeatedly selecting different phase values, producing phase-shifted PN codes, combining the phase-shifted PN codes with the synchronizing packet to produce test signals, and detecting the synchronizing phase value from the test signals). The transmission of the synchronizing packet and the initial phase adjusting at the various network stations occur before the data packet in issue is transmitted to the first station from the second station. Thereafter, the searching at the first station for a phase value that synchronizes the PN code of the station with the data packet transmitted by the second station comprises setting upper and lower bounds for a restricted set of phase values corresponding to the phase of the synchronizing packet, selecting different phase values from the restricted set, producing phase-shifted PN codes corresponding to the PN code of the station shifted in phase according to each of the phase values selected from the restricted set, combining the phase-shifted PN codes with the data packet to produce test signals, and detecting from the test signals a phase value which synchronizes the PN code with the data packet. The term "PN code of the station" as used herein should be understood as referring to the PN code used by a station to spread spectrum encode or decode packets rather than intermediate test signals generated by searching for synchronizing phase values.

The synchronizing packet has a phase corresponding to that of the PN code of the source station at the time of its transmission. When the PN codes of the other stations are adjusted to synchronize to the packet, their phases then correspond to the current phase of the source station phase-delayed by an amount corresponding primarily to packet travel time. For example, the chip generation and transmission rate of each network station might typically be 10 megachips/second. Assuming a maximum separation between any two network stations of 500 feet, the transmission delay has a maximum value of 0.5 microseconds (1 nanosecond per foot for electromagnetic transmissions) and the resulting phase delay is 5 chips. This represents the maximum phase difference then existing between the PN codes of the various stations, including the relevant first and second stations between which the data packet is to be transmitted. When the data packet is thereafter transmitted by the second station using the current phase value of its PN code, the phase of the received data packet is shifted relative to the PN code of the first station by no more than 10 chips (an additional phase delay having a maximum value of 5 chips being introduced during transmission of the data packet). Accordingly, the search at the first station to determine a phase value synchronizing the PN code of the station with the data packet requires only a restricted range of phase values to be considered. For example, upper and lower bounds for the restricted set of phase values might be set by adding positive and negative offsets of 10 chips to the current phase of the PN code of the first station. Accordingly, a range of no more than 20 chips might be searched, rather than a relatively exhaustive range corresponding to the number of chips in the PN code (typically in excess of 100 chips). Relative drifting of station PN codes owing to frequency differences between PN code generators will normally not be a significant factor in such matters, assuming periodic transmission of synchronizing packets. However, as discussed more fully below, the method of the invention can be readily adapted to accommodate loss of relative synchronization owing to such drift.

The method is applicable inter alia to polled local area networks. The term "polled local area network" as used in the specification should be understood as a network in which a base station transmits polling packets (packets uniquely addressed to specific polled stations) and in which each polled station transmits packets only in response to polling packets addressed to the station. A polling packet generated by the base station can serve as the synchronizing packet for purposes of the invention. It will be apparent to those skilled in the art that in a polled local area network each polling packet is decoded by all polled stations, but is discarded by a station if not addressed to the station. Although a polling packet may ultimately be discarded, the process of decoding the packet nevertheless produces or maintains a measure of synchronization among the PN codes of the various network stations.

In a polled local area network, the method may comprise a relatively simple method for determining phase values at the base station which synchronize the PN code of the base station with a response packet. The method involves encoding a polling packet with the PN code of the base station phase-shifted according to a predetermined phase value. A narrow-range search may be performed at the base station for an expected response packet, and to that end, a restricted search set may be determined by setting the lower bound of the search set to the predetermined phase value plus a first predetermined offset and setting the upper bound to the predetermined phase value plus a second predetermined offset. In such a system configuration, the response packet is effectively phased delayed relative to the predetermined phase value by an amount corresponding to the round-trip travel time of the associated polling and response packets. Under the exemplary system conditions discussed above (namely, the specified maximum station separation and chip rates), this delay would be a maximum of 10 chips. Accordingly, the lower bound might be set to the current phase value of the base station PN code (the predetermined phase value used to encode the polling packet plus a zero offset) and the upper bound might be set to the current phase value of the PN code plus an offset of 10 chips. This method intrinsically permits the response packets to be formed with shorter synchronization headers. Since the base station must decode one-half of all network packets in such a local area network, a considerable increase in data transfer rates can be achieved.

In another aspect, the invention provides a method of determining phase values that synchronize a PN code generated at a station of a local area network with temporally spaced-apart network packets transmitted through the air and received by the network station. The method comprises performing a wide range search for a phase value synchronizing the PN code of the network station with a first of the packets. The wide-range search comprises repeatedly selecting different phase values for the PN code of the network station from a relatively exhaustive set of phase values, producing phase-shifted PN codes corresponding to the PN code of the network station shifted in phase according to each of the selected phase values, combining the phase-shifted PN codes with the first packet to produce signals corresponding to the selected phase values and detecting from the signals a phase value which synchronizes the PN code of the network station with the first received packet. The method comprises performing a narrow-range search for phase values synchronizing the PN code of the network station with each of the packets succeeding the first packet. The narrow-range search comprises selecting different phase values for the PN code of the network station from a restricted set of phase values with predetermined upper and lower bounds corresponding to a phase value that synchronized the PN code with an immediately proceeding one of the packets, producing phase shifted PN codes corresponding to the PN code shifted in phase according to each of the phase values selected from the restricted set, combining the phase-shifted PN codes with a current one of the packet to produce signals each corresponding to a different phase value selected from the restricted set, and detecting from the signals a phase value of the restricted set which synchronizes the PN code of the network station with a current data packet. In a more general approach, this method involves switching from the wide-range search mode to the narrow-range search mode in response to detection of a phase value synchronizing the PN code of the station with a received data packet and switching from the narrow-range mode to the wide-range search mode whenever a predetermined period of time has expired from detection of a synchronizing phase value. The first packet serves effectively as a synchronization packet and might be sacrificed to produce a predetermined measure of synchronization between the source station and the receiving station (together with other network stations which must typically hunt at all times for transmitted packets). In the more general adaption of the method, the switching between search modes accommodates the likelihood that synchronization of source and receiving station PN codes will at some time be lost.

To permit greater reliability in the detection of synchronizing phase angles, the synchronizing packets may contain an indicator identifying the packet as a synchronizing packet. This synchronizing packet indicator ("SPI") serves essentially to distinguish the packet (or a portion which has been successfully decoded) from spurious noise. The SPI is preferably located in a trailing portion of the packet. This is important if very short synchronization headers are used, as a station may not synchronize to a received packet before a large portion of the packet has effectively been lost. In such circumstances, the SPI permits confirmation that a phase angle did in fact synchronize the PN code of the station to a synchronizing packet. In a polled local area network, an SPI may be inserted into each polling packet to assist the polled stations in identifying a true synchronizing phase value. If the base station is adapted to perform only narrow-range searches in the manner described above, there is no need to insert an SPI into the response packets of the polled stations.

A measure of parallel searching for phase values may be incorporated into either or both the broad-range and narrow-range searches. The selecting of different phase values may comprise selecting different subsets of phase values, each subset comprising a number of different phase values. The producing of phase-shifted PN codes may comprise producing a concurrent set of phase shifted PN codes in response to each currently selected subset of phase values, each phase shifted PN code of the set corresponding to a different phase value of the currently selected subset of phase values. The combining of the phase-shifted PN codes with a currently received packet to produce signals may comprise combining each of the current set of phase-shifted PN codes with the currently received packet to produce simultaneously a corresponding set of selected phase values. The detecting of the synchronizing phase angles and end of the packet indicators may involve simultaneously checking each current set of signals for a synchronizing phase angle and for the presence of an end of packet indicator in the signal produced by decoding the received packet or a portion thereof. Alternatively, to limit the amount of detection circuitry required, the presence of the indicator may be detected in the data signal otherwise produced by spread spectrum decoding a received packet or portion thereof with the PN code of the station phase-shifted according to a detected synchronizing phase value. In a network of limited geographic area, the narrow-range may be considerably restricted by employing the principles of the invention, and it may be possible to perform a single parallel search to locate a required synchronizing phase value. However, it is expected that in the wide-range search mode repeated selection of subsets and repeated testing will be required to avoid excessive parallelism and attendant costs.

The methods of the present invention are not restricted to polled local area networks. The synchronization methods can be readily incorporated into networks involving token-passing. They may also be used in connection with multiple point access systems in which a mediation mechanism is provided to accommodate conflicting demands for transmission channels. It should be noted that no unique source of synchronizing packets and no dedication of packets exclusively to synchronizing functions is required in the broader aspects of the invention.

In other aspects, the invention provides local area networks and apparatus for use in implementing the methods of the invention. The various aspects of the invention will be more specifically defined in the appended claims.

DESCRIPTION OF THE DRAWINGS

The invention will be better understood with reference to drawings illustrating a preferred embodiment in which.

DESCRIPTION OF PREFERRED EMBODIMENT

Figure 1:
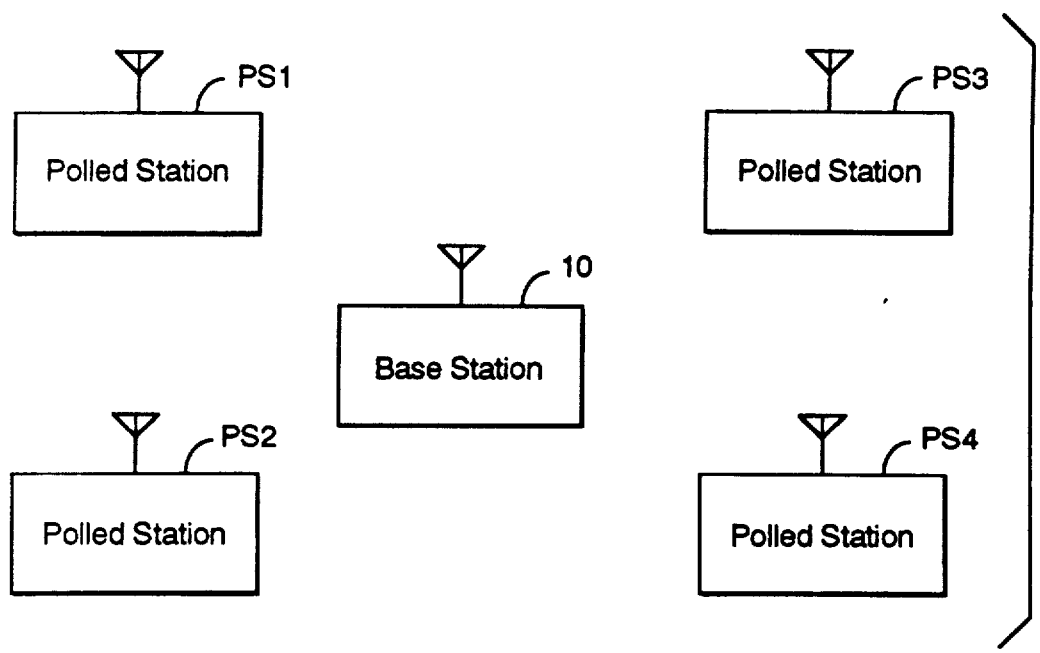
FIG. 1 is a schematic representation of a polled local area network.

Reference is made to FIG. 1 which illustrates a polled local area network comprising a base station 10 adapted to transmit polling packets and four polled stations PS1-PS4 adapted to transmit response packets. The base station 10 serves as a general communications controller regulating data transfer throughout the network. The polled stations PS1-PS4 might be associated with data processing equipment operated by system users. The base station 10 might be associated with a central computer and shared system resources such as mass storage, printers and communication channels.

In the local area network, any data transferred between polled stations is relayed through the base station 10. The base station 10 transmits polling packets sequentially to the polled stations PS1-PS4, each polling packet being addressed to a particular one of the polled stations. Each polled station decodes each polling packet, but only the addressed station responds, transmitting a response packet addressed to the base station 10. The response packet may contain data to be transferred to mass storage associated with the base station 10 or to another polled station, or may constitute a request for data to be transferred from mass storage or from another polled. The response packet is received by the other polled stations, but is discarded. The overall configuration and operation of such a system is conventional, and the implementation of the required packet handling functions will be readily apparent to those skilled in the art.

Figure 2:
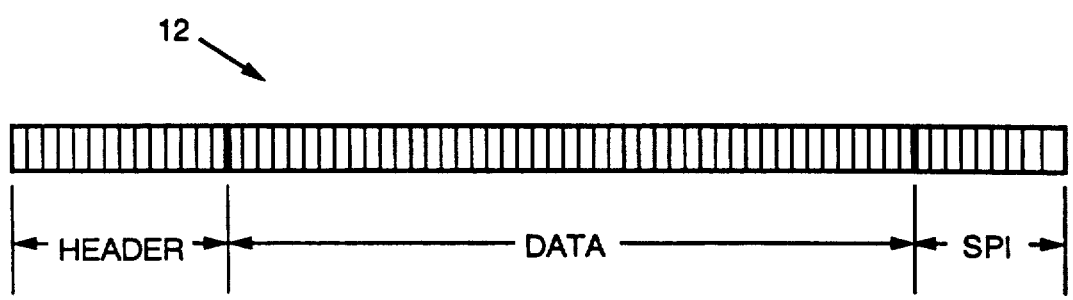
FIG. 2 diagrammatically illustrates a typical polling packet generated by a base station of the network.

A typical polling packet 12 generated by the base station 10 is illustrated in FIG. 2. It comprises a synchronization header which is simply a predetermined sequence of bits. Once spread spectrum encoded with a PN code common to the network stations, the synchronization header can be used at a polled station to synchronize a PN code of the station to the packet prior to decoding of any contained data. A data portion contains packet control data and the information to be transferred. Such data will commonly contain an address field identifying the destination station, an address field identifying the source station, a command field, and link management and control information. The content of the packet is conventional except for an SPI inserted into a trailing portion of the packet (in this embodiment, at the very end of the packet itself such that the SPI).

The SPI indicator in this embodiment of the invention is simply a series of bits which uniquely identify the packet as a network synchronizing packet (effectively a polling packet of the base station). Each such polling packet is direct sequence spread spectrum encoded by the base station 10 prior to transmission using a PN code common to the network stations. It is then encoded onto an RF carrier of a frequency common to the stations and transmitted through air to the polled stations PS1-PS4.

The response packets of the network are similar to the polling packet and an exemplary response packet has consequently not been illustrated. However, in this embodiment of the invention, no SPI is required in each response packet because of the manner in which decoding is performed at the base station 10. Instead, a conventional end of packet indicator might terminate the packet. The response packets are all direct sequence spread spectrum encoded by the polled stations PS1-PS4 using the PN code common to the network, encoded onto an RF carrier frequency of a common frequency, and transmitted through air to the base station 10.

Figure 4:
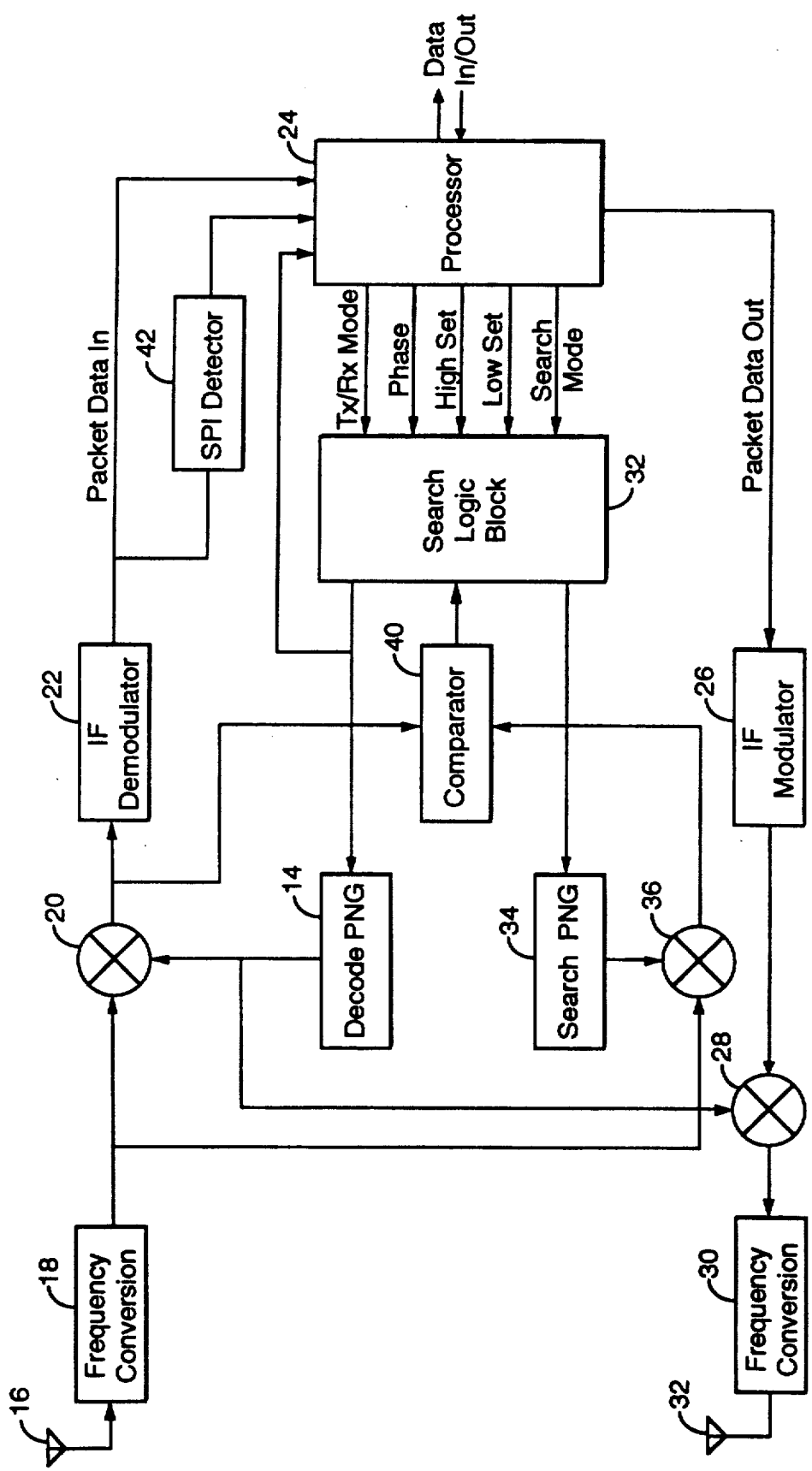

Apparatus used to encode and decode packets at the polled station PS1 is illustrated in FIG. 4. The apparatus includes a PN code generator 14 (labelled as a "decode PNG" in FIG. 4) which serves to generate what is referred to herein as "the PN code of the station" for both decoding of polling packets received by the station and encoding of packets transmitted by the polled station PS1. Packets are received at an antenna 16 and are demodulated from their wide-band state down to a narrower-band IF frequency by a frequency conversion block 18. A balanced mixer 20 then combines the IF signal with the PN code of the station PS1 to direct sequence spread spectrum decode the packet. The signal produced by the balanced mixer 20 is then demodulated by an IF demodulator 22 to produce a narrow-band signal (received packet data). The fully-decoded packet may then be received by a microprocessor 24 programmed to perform conventional packet handling functions. The microprocessor 24 may perform a cyclic redundancy check to detect transmission errors and may determine whether the packet is intended for the polled station PS1 or should be discarded. The received data may then be transferred to any data processing equipment (not illustrated) associated with the station PS1. It should be noted that the apparatus can be adapted to eliminate intermediate processing at IF frequencies.

Response packets of the polled station PS1 are assembled by the microprocessor 24 and may include data from any associated data processing equipment which is to be transmitted. Each response packet is subject to modulation by an IF modulator 26 to produce an IF signal. A balanced mixer 28 then combines the IF signal with the PN code of the station to direct sequence spread spectrum encode the response packet. Finally, the spread spectrum encoded response packet is modulated by a frequency conversion block 30 onto an RF carrier of the common carrier frequency of the network and is transmitted by a transmitting antenna 32. Use of separate receiving and transmitting antennas is not significant to the invention.

Direct sequence spread spectrum decoding of a received polling packet involves searching for phase angles which synchronize the PN code of the polled station PS1 with the received packet. The searching is controlled by a state machine identified in FIG. 4 as a search logic block 34. The search logic block 34 receives a control signal from the microprocessor 24 specifying whether a transmit or receive mode required (designated "Tx/Rx mode in FIG. 4), a signal specifying the current phase value of the station PN code for transmission purposes (designated "Phase" in FIG. 4), and signals specifying upper and lower bounds for restricted searches for synchronizing phase angles (designated as "High Set" and "Low Set" in FIG. 4). A control signal (designated as "Search Mode" in FIG. 4) is also applied to the search logic block 34 to set either wide-range or narrow-range search modes. The microprocessor 24 will normally be programmed in a conventional manner to receive data from a system operator specifying upper and lower offsets for restricted search sets. The upper offset might typically be set to +5 chips and the lower offset might typically be −5 chips. The microprocessor 24 will calculate the High Set and Low Set signals by adding the operator-specified offset to what it recognizes and records as the current operating phase of the polled station (otherwise applied to the search logic block 34 in the Phase signal). As explained more fully below, the setting of the offsets at the polled stations PS1-PS4 of this particular embodiment of the invention is somewhat arbitrary as the PN codes of the polled stations PS1-PS4 in steady-state operation are theoretically synchronized with any polling packet received from the base station 10 (except for any cumulative drift between successive polling packets attributable to differences in the operating frequencies of the PN code generators of the base station 10 and the polled station PS1).

The search logic block 34 controls certain searching means which are used for both wide-range and narrow-range search modes. The searching means comprise a PN generator 36 (labelled as a "search PNG" in FIG. 4) which generates the same PN code as does the decode PNG 14. The search PNG 36 (like the decode PNG 14) is adapted to receive phase values from the search logic block 34 and to adjust the phase of its PN code according to the specified phase value. In the wide-range search mode, the decode PNG will commence decoding with a phase value specified by the Phase signal produced by the microprocessor 24. The search logic block 34 selects different phases from a relatively exhaustive set of phase values in a predetermined pseudorandom manner. Assuming a PN code length of 127 chips, there are 127 possible synchronizing values which can be tested. Phase-shifted PN codes are sequentially produced by the search PNG 36, one phase-shifted PN code corresponding to each different one of the selected phase values. The phase-shifted PN codes are then combined sequentially with an incoming received packet by a balanced mixer 38 to produce a series of test signals. The test signals are compared by a comparator 40 with the spread spectrum decoded signal produced by the other balanced mixer 20 (which simply combines incoming signals with the PN code of the station at its current phase value). The comparator 40 detects from relative signal strengths whether any randomly selected phase value indicates better correlation (greater signal strength) than the phase value currently being used by the decode PNG 14 to decode incoming signals. Upon detection of such a superior test phase value, the search logic block 34 sets the PN code of the decode PNG 14 to the test phase value for purposes of decoding any further incoming data.

The wide-range search mode described above is conventional except for response to SPI's which is discussed below. Although only a single search PNG 36 has been illustrated and sequential searching for synchronizing phase values has been described, it is fully contemplated that the invention may involve adaption of the search logic block 34 to select concurrent sets of different phase values from a relatively exhaustive set of phase values. In such circumstances, a number of parallel PN code generators will be provided in place of the single search PNG 36 to respond simultaneously to each subset of selected phase values to produce concurrent subsets of phase-shifted PN codes. A plurality of balanced mixers will be provided to produce corresponding concurrent test signals, each corresponding to a different one of the phase-shifted PN codes of any concurrent subset. The test signals will be concurrently compared with the current data signal generated by the decode PNG 14 to check for superior correlation. The various means required to implement such parallel processing are amply described and illustrated in prior U.S. Pat. No. 4,774,715 to Messenger, the teachings of which prior patent are incorporated herein by reference.

The narrow-range search mode is a substantially identical in overall approach to the wide-range search mode. The principal difference is that prospective synchronizing values for the station PN code are selected from a restricted set of phase values. The phase value of the decode PNG 14 may initially be set to a phase value which synchronized the PN code of the station with an immediately preceding polling packet. That value is recorded by the microprocessor 24 and is specified by the Phase signal generated by the microprocessor 24. The upper and lower bounds of the restricted search set are set by the High Set and Low Set signals provided by the microprocessor 24. If sufficient parallel processing is provided, the narrow-range search might require only a single pass at the received packet to locate a synchronizing phase value. However, even such a measure of parallel processing is expensive, and it is fully expected that concurrent sets of test signals will be repeatedly produced and that several passes might be required ultimately to find a synchronizing phase value.

The switching between narrow-range and wide-range search modes is controlled by the microprocessor 24 in response to the SPI's contained in the polling packets. To that end, logic circuitry 42 designated as "SPI detector" in FIG. 4 is provided. The SPI detector 42 receives the stream of data produced by the IF demodulator and checks in a conventional manner for the occurrence of a bit pattern corresponding to an SPI, changing the state of a logic signal applied to the microprocessor 24 in response to detection of an SPI. The microprocessor 24 continuously receives the phase angle signal otherwise applied by the search logic block to the decode PNG 14 and upon the change of state of the logic signal records the current value of the phase angle signal. Detection of the SPI of course indicates that a proper synchronizing phase value has been detected, as otherwise the SPI would not have been decoded. The Phase signal produced by the microprocessor 24 changes accordingly, as do the High Set and Low Set signals. The microprocessor 24 then switches the search logic block 34 from the wide-range search mode to the narrow-range which is used to hunt for any further packet transmissions.

The microprocessor 24 switches the search logic block back to the wide-range search mode by a simple timing-out algorithm. If general synchronization of the PN code of the apparatus with the PN code of the base station 10 is lost, that is, polling packets are not properly detected and decoded owing to a failure to detect synchronizing values in the narrow-search mode, SPI's are not detected. The microprocessor 24 is adapted by appropriate programming to detect the time elapsed since the last detection of a SPI. (The clock function can be provided in a manner conventional to microprocessors.) When a predetermined period of time elapses, it is assumed that detection errors have occurred and that the narrow-range search mode is now inadequate. The time period may be set to correspond to the expected interval between transmission of polling packets or some multiple thereof. The microprocessor 24 thereupon switches the search logic block 34 back to the wide-range search mode.

Similar apparatus is provided at the other polled stations PS2–PS4 and also at the base station 10. However, at the base station 10, the wide-range search mode is entirely disabled. The microprocessor 24 of the base station 10 is adapted by appropriate programming to set the transmission phase of its encoding and decoding PN generator to a predetermined phase value $\Omega$ for encoding and transmission of each polling packet. That phase value might, for example, be a constant zero phase value for all polling packets. Accordingly, regardless how the PN code of the base station 10 may be phase-shifted to decode response packets, the PN code is set back to the predetermined transmission phase value prior to encoding and transmission of each polling packet. The result is that each response packet may be expected to have a phase corresponding to the predetermined transmission phase value $\Omega$ of the base station 10 delayed in phase by round-trip packet travel delays. For example, if the polled station PS1 and base station 10 are separated by 500 feet, then the PN code of the polled station PS1 is expected to be synchronized with the base station PN code (after decoding each polling packet) except for a maximum 5-chip delay, reflecting the maximum travel time of a polling packet to the polled stations PS1–PS4. An additional phase delay having a maximum 5-chip value is introduced when the corresponding response packet travels to the base station 10. The response packet can consequently be expected to be phase-delayed by a maximum of 10 chips relative to the predetermined transmitting phase of the base station 10. The microprocessor 24 of the base station 10 may consequently be programmed to apply High Set and Low Set signals to an associated search logic block which correspond to the predetermined transmission phase value $\Omega$ of the base station PN code. Accordingly, the upper limit of the restricted search set might be set the predetermined transmission phase value $\Omega$ of the base station (an offset of 0 being added) and the lower limit might be set to the transmission phase value $\Omega$ less 10 chips.

Figure 3:
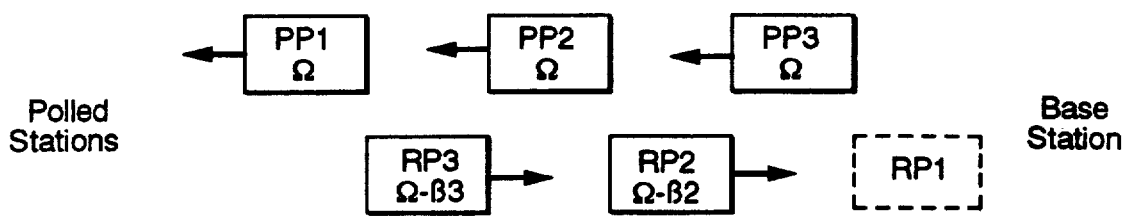
FIG. 3 represents a series of communication transactions involving polling and response packets transmitted between the base station and one polled station of the network; and, FIG. 4 is schematic representation of apparatus for direct sequence spread spectrum and coding and decoding packets.

Typical network operation will be described with reference to FIG. 3 which diagrammatically illustrates a series of temporarily spaced-apart polling and response packets. The first polling packet PP1 might be addressed to the polled station PS1 (and encoded by the base station 10 at a constant phase $\Omega$). Assuming that this is the first in a series of polling packets transmitted by the base station 10, the search at the polled station PS1 for a synchronizing value would be performed in a wide-range search mode. If a particularly short header is being used, there is some likelihood that the polled station PS1 will not find a synchronizing phase value in time to decode the entirety of the packet, but will only detect the SPI contained in polling packet PP1 thereby confirming that a base station polling packet has been received. No response packet is transmitted, and the absence of a response has been indicated in FIG. 3 with a response packet RP1 shown in phantom outline.

The narrow-range search mode is now entered at the polled station PS1 in view of the detection of the SPI associated with the polling packet PP1. Although the first polling packet PP1 was not fully decoded, the PN code of the station PS1 will have been synchronized to the PN code of the base station 10 with a phase offset of $\beta 1$ (the travel delay of the polling packet to the station PS1), and the microprocessor 24 records the value $(\Omega - \beta 1)$ as a synchronizing phase value for the PN code of the station PS1. It should be noted that the same procedures are followed at the other polled stations PS2-PS4 since each polled station attempts to decode the polling packet regardless to whom the packet is addressed. The first polling packet PP1 serves essentially as a synchronizing packet whose data is sacrificed to produce a predetermined measure of synchronization.

Since no response was received to the first polling packet PP1, the base station 10 thereafter transmits a second polling packet PP2 identical to the first polling packet PP1, as is conventional in a polled local area network. A narrow-range search is performed at the polled station PS1 to determine a phase value which synchronizes the PN code of the station PS1 with the polling packet PP2, the search range being centered about the previously record phase value of $(\Omega - \beta 1)$. The PN code of the station PS1 is then adjusted to the synchronizing value determined by the narrow-range search and used to decode the polling packet PP2 (with further adjustment if alternative test phase values results in stronger correlation). When the SPI of the polling packet PP2 is detected, receipt of a proper polling packet is confirmed and the microprocessor 24 records the current synchronizing phase value and sets new upper and lower bounds for the restricted search mode corresponding to this new synchronizing phase value. The newly-recorded synchronizing phase value is once again $(\Omega - \beta 1)$. (The existence of multiple transmission paths with different travel delays might result in a different synchronizing value, but this will not be considered here.) Although the transmission phase value $\Omega$ is constant in the frame of reference of the base station 10 (such as an arbitrary zero phase value), it may actually be time-varying in the frame of reference of the polled stations PS1-PS4 because of frequency differences between respective PN code generators. Accordingly, even assuming a single transmission path with a constant travel-time phase delay of $\beta 1$, the synchronizing phase values recorded by the microprocessor 24 will vary. The search method, however, causes the PN code of the polled station PS1 to track the base station PN code despite such relative phase drifts. It should be noted that the other polled stations PS2-PS4 will simultaneously perform similar searches and synchronizing procedures in response to the packet PP2.

The polled station PS1 recognizes the polling packet PP2 as being addressed to it. The station PS1 then prepares a corresponding response packet RP2. The response packet RP2 is spread spectrum encoded according to the synchronizing phase angle determined by the station PS1 to have synchronized its PN code with the corresponding previously-received polling packet, namely, the phase value $\Omega - \beta 1$.

The search apparatus at the base station 10 searches for phase values synchronizing its PN code with the expected response packet RP2. This search may be initiated immediately after transmission of the corresponding polling packet PP2. As mentioned above, only a narrow-range search mode is used. The restricted search set in respect of every polling packet has an upper bound of $\Omega + 0$ and a lower bound of $\Omega - 10$. The synchronizing phase value is determined and used to decode the response packet RP2.

The base station 10 then transmits the next polling packet PP3 which is assumed to be addressed to the polled station PS2. The polling packet PP3 is encoded by the base station 10 with the phase of its PN code set to its transmission phase value $\Omega$. The polled station PS1 once again receives the polling packet PP3. It performs a narrow range search similar to that performed in respect to the immediately preceding polling packet PP2, except that the search range now corresponds to the synchronizing phase value which synchronized the PN code of the polled station PS1 with the previously received polling packet PP2. Similar procedures are followed at each of the other polled stations PS2-PS4. The polled station PS2 may decode the polling packet PP2 at a phase value $\Omega - \beta 2$, where $\beta 2$ is a phase delay reflecting the different travel time of the packet PP2 to the station PS2. Since the polling packet PP3 is address to the polled station PS2, it transmits a response packet RP3 encoded with the PN code of the station PS2 set to a phase of $\Omega - \beta 2$. The packet RP3 is decoded by the base station 10 using a narrow-range search in precisely the same manner as described with respect to the previous response packet RP2 (the same restricted search set being used).

The above series of transactions represent an ideal case and are not necessarily indicative of actual operation. Transmission errors can occur in any local area network for a wide variety of reasons, quite apart from a total failure to synchronize to a packet, and these might require re-transmission of both polling and response packets. Such error handling is conventional in a polled local area network and will not be described in further detail. However, in the polled local area network of the invention, a failure by any polled station to synchronize to a currently received polling packet in its narrow-range search mode will result in a switching to the wide-range search mode for any succeeding packet (unless, of course, the narrow-range search mode is able to detect at least the SPI of the currently received polling packet). The wide-range search for the next polling packet once again restores a predetermined measure of synchronization between the PN code of the polled station and that of the base station 10 and results in a switching back to the narrow-range search mode. It will be apparent that in this embodiment of the invention each polling packet serves as a synchronizing packet. Although one or more packets may be sacrificed, it is expected that faster narrow-range searching will be used with respect to the majority of packets thereby permitting greater overall data transfer rates.

In configuring the polled local area network described herein, it is desirable to centre the base station 10 among the polled stations PS1-PS4. Accordingly, if all polled stations PS1-PS4 are within 500 feet, the base station 10 can be pre-set to search within a range of 10 chips for synchronizing phase values. This is not an unreasonable limitation in many local area networks. Increasing the maximum separation requires an increase in the search range of the base station 10, and consequently a requirement for longer synchronization headers in the response packets. In this particular application of the invention, it will be apparent that increasing the physical separation of the stations has little effect on the narrow-range search mode of a polled station. The upper and lower bounds of the restricted search sets of the polled stations PS1-PS4 being independent of geometry and set in a manner sufficient to accommodate relative drifting of PN codes between successive polling packets.

It is possible, however, to avoid setting the restricted search range of the base station 10 in response to the physical geometry of the local area network. For example, the base station 10 can be adapted to search in both wide-range and narrow-range modes for response packets in a manner entirely analogous to that of the polled stations PS1-PS4. Since the base station 10 may be required to respond to packets from four polled stations PS1-PS4, the base station 10 can be adapted to record phase values on a station-by-station basis that tend to synchronize its PN code with response packets from each polled station. The base station 10 of course expects to receive a response packet from a particular polled station in response to any given polling packet. Accordingly, the base station 10 can be readily adapted to retrieve the appropriate synchronizing phase value and set appropriate upper and lower bounds for a restricted search set immediately upon transmission of a polling packet to any particular polled station. The upper and lower offsets in such circumstances are not dependent on network geometry: they need only be sufficient to accommodate drifting of the PN code of the particular polled station relative to the base station 10 between successive polling packets. The response packets may have SPI's to assist in confirming synchronization of the base station PN code with the response packets.

The search methods and apparatus described herein, particularly, the use of wide-range and narrow-range search modes and the method of switching between such modes, is applicable to a variety of network configurations. In a network involving relatively free-form data transmission, one station may be dedicated solely to periodic transmission of synchronizing packets. If the synchronizing packets are to be particularly short, an PSI indicator may be inserted into a trailing portion of each synchronizing packet. Decoding of a synchronizing packet by the other network stations will tend to maintain a measure of synchronization among the PN codes of the various stations. The other stations will transmit all their packets at phase values which correspond substantially to the most recently decoded synchronizing packet. All PN codes will tend to synchronize about the phase of the synchronizing station less travel time delays to the individual stations. The maximum physical separation between any two stations will largely determine the maximum phase difference which exists between the PN code of any station and a received data packet. The delay is essentially 1 chip per 100 feet at a chip rate of 10 megachips per second. Accordingly, predetermined upper and lower bounds reflecting the geometry of the network can be set for restricted searches at each station in respect of other network packets.

In the embodiments discussed above, during searching for a phase value synchronizing the PN code of a station with a received packet, test signals corresponding to different potential synchronizing phase value are entirely distinct from the data signal otherwise recovered. In the prior art, it is known to use only a single balanced mixer together with a single PN code generator to perform both acquisition and decoding functions. Basically, test signals are produced by the balanced mixer until a signal of sufficient strength is produced, indicating that the phase of the associated code generator has been adjusted to a synchronizing value. The code generator remains at the synchronizing phase value to decode data from a packet or until synchronization is lost. Although not preferred, such acquisition and tracking arrangements and others which effectively treat the data signal as a test signal for acquisition purposes should be regarded as an alternative within the ambit of the broader aspects of the invention.

A particular embodiment of the invention has been illustrated and other embodiments have been described. It will be appreciated that further embodiments of communications systems and other modifications can be made without necessarily departing from the scope of the appended claims.

We claim:

1. In a local area network comprising a plurality of stations each adapted to generate a PN code common to the stations, to transmit packets spread spectrum encoded with the PN code and to decode packets by combining the packets with the PN code, a method of determining phase values that synchronize the PN code of a first of the stations with a data packet transmitted through air by a second station to the first station, comprising:

transmitting from any one of the stations through air to the other stations a synchronizing packet direct sequence spread spectrum encoded with the PN code of the one station, the transmission of the synchronizing packet occurring before transmission of the data packet of the second station;

adjusting the phase of the PN code of each of the other stations prior to transmission of the data packet by the second station to a phase value synchronizing the phase of the PN code of the station with the phase of the transmitted synchronizing packet, the adjusting of the phase at each of the other stations comprising producing phase-shifted PN codes corresponding to the PN code of the station shifted in phase according to different phase values, combining the transmitted synchronizing packet with the phase-shifted PN codes to produce signals and detecting from the signals the synchronizing phase value;

searching at the first station for a phase value which synchronizes the PN code of the first station with the data packet, the searching at the first station comprising:
  a. setting predetermined upper and lower bounds for a restricted set of phase values corresponding to the phase of the synchronizing packet,
  b. selecting different phase values for the PN code of the first station from the restricted set,
  c. producing phase-shifted PN codes corresponding to the PN code of the first station shifted in phase according to each of the phase values selected from the restricted set of phase values, d. combining the phase-shifted PN codes with the data packet to produce signals each corresponding to a different phase value selected from the restricted set, e. detecting from the signals a phase value which synchronizes the PN code with the data packet.

2. The method of claim 1 in which:

the synchronizing packet is a polling packet transmitted by the first station and addressed to the second station and the data packet is a response packet addressed to the first station;

the transmission of the polling packet by the first station comprises direct sequence spread spectrum encoding the polling packet with the PN code of the first station phase-shifted according to a predetermined phase value;

the transmission of the response packet by the second station includes spread spectrum encoding the response packet with the phase-adjusted PN code of the second station;

the setting of the upper and lower bounds of the restricted set of phase values at the first station comprises setting the lower bound to the predetermined phase value plus a first predetermined offset and setting the upper bound to the predetermined phase value plus a second predetermined offset.

3. The method of claim of claim 2 in which the step of adjusting the phase of the PN code of the other stations comprises repeatedly selecting the different phase values for production of phase-shifted PN codes from a relatively exhaustive set of phase values.

4. A method as claimed in claim 1 in which:

the synchronizing packet is transmitted by the second station;

the adjusting of the phase of the PN code of the first station to a phase value which synchronizes the PN code of the first station with the phase of the synchronizing packet comprises repeatedly selecting different phase values for production of phase-shifted PN codes at the first station from a relatively exhaustive set of phase values;

the setting of the upper and lower bounds of the restricted set comprises setting the lower bound to the detected synchronizing phase value which synchronized the phase of the PN code of the first station with the phase of the synchronizing packet plus a first predetermined offset and setting the upper bound to the detected synchronizing phase value which synchronized the phase of the PN code of the first station with the phase of the synchronizing packet plus a second predetermined offset.

5. The method of claim 4 in which:

the transmission of the synchronizing packet includes inserting into a trailing portion of the synchronizing packet an indicator identifying the packet as a synchronizing packet;

the detecting at each of the other stations of the synchronizing phase value synchronizing the phase of the PN code of the station with the phase of the synchronizing packet comprises spread spectrum decoding at least a portion of the synchronizing packet containing the indicator by combining the synchronizing packet with PN code of the station phase-shifted according to the synchronizing phase value and detecting the indicator in the decoded packet portion.

6. The method of claim 1 in which:

the one station transmitting the synchronizing packet is a station other than the first or second stations;

the transmission of the synchronizing packet includes inserting into a trailing portion of the synchronizing packet an indicator identifying the packet as a synchronizing packet;

the detecting at each of the other stations of the synchronizing phase value synchronizing the phase of the PN code of the station with the phase of the synchronizing packet comprises spread spectrum decoding at least a portion of the synchronizing packet by combining the synchronizing packet with PN code of the station phase-shifted according to the synchronizing phase value and detecting the indicator in the decoded packet portion.

7. A method of determining phase values that synchronize a PN code generated at a network station of a local area network with temporally spaced-apart packets transmitted through the air by a source station, the method comprising:

generating the PN code at the source station and spread spectrum encoding each of the temporally spaced-apart packets at the source station prior to transmission by combining each of the packets with the PN code of the source station phase-shifted to a substantially constant preset phase value;

performing a wide-range search for a phase value synchronizing the PN code of the network station with a first of the packets, the wide-range search comprising a. repeatedly selecting different phase values for the PN code of the network station from a relatively exhaustive set of phase values;

b. producing phase-shifted PN codes corresponding to the PN code of the network station shifted in phase according to each of the selected phase values;

c. combining the phase-shifted PN codes with the first packet to produce signals each corresponding to a different phase value selected from the relatively exhaustive set;

d. detecting from the signals a phase value which synchronizes the PN code of the network station with the first received packet;

performing a narrow-range search for phase values synchronizing the PN code of the network station with each of the temporally spaced-apart packets succeeding the first packet, the narrow-range search comprising a. selecting different phase values for the PN code of the network station from a restricted set of phase values with predetermined upper and lower bounds corresponding to a phase value which synchronized the PN code of the network station with an immediately preceding one of the packets;

b. producing phase-shifted PN codes corresponding to the PN code of the network station shifted in phase according to each of the phase values selected from the restricted set;

c. combining the phase-shifted PN codes with a current one of the packets to produce signals each corresponding to a different phase value selected from the restricted set;

d. detecting from the signals a phase value of the restricted set which synchronizes the PN code of the network station with the current data packet.

8. The method of claim 7 adapted for use in a polled local area network in which:

each of the temporally spaced-apart packets is a polling packet;

the method comprises inserting into a trailing portion of each of the packets prior to encoding and transmission by the source station an indicator identifying that the packet as a source station packet;

in each of the wide-range and narrow-range searches, the detecting of a phase value synchronizing the PN code of the network station with each of the temporally spaced-apart packets comprises spread spectrum decoding at least a portion of each of the packets by combining the packet packet with PN code of the station phase-shifted according to the synchronizing phase value and detecting the indicator in the decoded packet portion;

the method comprises switching from the wide-range search to the narrow-range search in response to detection of the indicator in a decoded portion of the first of the packets.

9. A method of determining phase values that synchronize a PN code generated at a network station of a local area network with temporally spaced-apart network packets transmitted through air and received by the network station, each network packet being direct sequence spread spectrum encoded with the PN code, the method comprising:

inserting a predetermined indicator into a trailing portion of each of the network packets prior to encoding and transmission of the network packet;

searching in either a wide-range search mode or a narrow-range search mode for phase values synchronizing the PN code of the network station with each of the network packets;

the wide-range search mode comprising a. repeatedly selecting different phase values for the PN code of the network station from a relatively exhaustive set of phase values;

b. producing phase-shifted PN codes corresponding to the PN code shifted in phase according to each of the phase values selected from the relatively exhaustive set;

c. combining the phase-shifted PN codes with a currently received one of the network packets to produce signals each corresponding to a different phase value selected from the relatively exhaustive set;

d. detecting from the signals corresponding to phase values selected from the relatively exhaustive set a phase value which synchronizes the PN code of the network station with the currently received network packet including decoding at least a portion of the currently received network packet by combining the packet portion with the PN code phase shifted according to the synchronizing phase value and detecting presence of the indicator in the decoded packet portion;

the narrow-range search mode comprising a. selecting different phases values for the PN code of the network station from a restricted set of phase values having predetermined upper and lower bounds corresponding to a phase value that synchronized the PN code of the network station with an immediately preceding one of the received network packets;

b. producing phase-shifted PN codes corresponding to the PN code of the network station shifted in phase according to each of the phase values selected from the restricted set;

c. combining the phase-shifted PN codes with a currently received one of the network packets to produce signals each corresponding to a different phase value selected from the restricted set;

d. detecting from the signals corresponding to phase values selected from the restricted set a phase value which synchronizes the PN code of the network station with the currently received network packet including decoding at least a portion of the currently received network packet by combining the packet portion with the PN code phase shifted according to the synchronizing phase value and detecting presence of the indicator in the decoded packet portion;

switching from the wide-range search mode to the narrow-range search mode in response to detection of the indicator in a received network packet;

switching from the narrow-range search mode to the wide-range search mode whenever a predetermined period of time has expired from detection of the indicator in a received network patent.

10. The method of claim 9 in which in at least the wide-range search mode:

the repeated selection of different phase values comprises repeatedly selecting different subsets of phase values, each subset comprising a plurality of different phase values;

the production of phase-shifted PN codes comprises producing a set of phase-shifted PN codes simultaneously in response to each currently selected subset of phase values, each phase-shifted PN code of the set of phase-shifted PN codes corresponding to a different phase value of the currently selected subset of phase values;

the combining of the phase-shifted PN codes with a currently received one of the packets to produce signals comprises combining each of the phase-shifted PN codes of the current set of phase-shifted PN codes with the currently received network packet to produce simultaneously a corresponding set of signals.

11. The method of claim 9 in which the network is a polled local area network, the temporally spaced-apart packets are polling packets transmitted by a base station comprised by the network and generating the PN code, and the predetermined indicator uniquely identifies each polling packet as a polling packet transmitted by the base station.

12. The method of claim 11 in combination with a method of determining phase values at the base station which synchronize the PN code of the base station with response packets transmitted through air by the network station to the base station in response to the polling packets, comprising:

direct sequence spread spectrum encoding each of the polling packet at the base station with the PN code of the base station phase-shifted according to a constant predetermined phase value of the base station;

encoding each of the response packets at the network station prior to transmission, the encoding of each of the response packets comprising a. adjusting the phase of the PN code of the network station to the detected synchronizing phase value which synchronized the PN code of the network station with the corresponding polling packet;

b. spread spectrum encoding the response packet prior to transmission with the phase-adjusted PN code of the network station;

searching at the base station for phase values which synchronize the PN of the base station with each of the response packets, the searching at the base station comprising:

a. setting predetermined upper and lower bounds for a restricted set of phase values corresponding to the predetermined phase value of the base station;

b. selecting different phase values for the PN code of the base station from the restricted set;

c. producing phase-shifted PN codes corresponding to the PN code of the base station shifted in phase according to each of the selected phase values;

d. combining the phase-shifted PN codes of the base station with a currently received on of the response packet to produce signals each corresponding to a different selected phase value;

e. detecting from the signals a phase value which synchronizes the PN code of the base station with the currently received response packet.

13. The method of claim 11 in which the base station inserts a synchronizing header into a leading portion of each polling packet prior to encoding and transmission by the base station, the method comprising setting the length of the synchronizing header for the polling packets, the setting of the length of the synchronizing header comprising:

a. transmitting a series of temporally spaced-apart test polling packets from the base station addressed to the network station and containing a synchronizing header, b. detecting whether a response packet is received from the network station in response to any one of the test polling packets, c. discontinuing the transmission of the series of test polling packets if a response packet is detected, d. setting an incrementally greater length for the synchronizing header if a response packet to the series of test polling packets is not detected, e. repeating steps a to d until a response packet from the network station is detected.

14. The method of claim 13 comprising repeating steps a-e of claim 13 successively for any other polled network station such that a length for the synchronization header is determined which causes all polled network stations to respond to polling packets from the base station.

15. In a local area network, apparatus for use in processing temporally spaced-apart network packets transmitted through air and direct sequence spread spectrum encoded with a predetermined PN code, the apparatus comprising:

means for generating the PN code;

means for receiving and decoding the network packets, the receiving and decoding means comprising means for adjusting the phase of the PN code of the apparatus to a phase value which synchronizes the PN code of the apparatus with each of the network packets and means for combining the phase-adjusted PN code with each packet to spread spectrum decode the packet, the phase adjusting means comprising means for searching in either a wide-range search mode or a narrow-range search mode for phase values synchronizing the generated PN code with the packets;

the searching means comprising a. means for selecting different phase values for the PN code of the apparatus from a set of phase values, b. means for producing phase-shifted PN codes corresponding to the PN code of the apparatus shifted in phase according to each of the selected phases, c. means for combining the phase-shifted PN codes with a currently received one of the packets to produce signals each corresponding to a different phase value selected from the set, d. means for detecting from the signals a phase value which synchronizes the PN code with the currently received packet;

the searching means being adapted in the wide-range search mode repeatedly to select the different phases values for the PN code of the apparatus from a relatively exhaustive set of phase values;

the searching means being adapted in the narrow-range search mode to select the different phases for the PN code of the apparatus from a restricted set of phase values having predetermined upper and lower bounds corresponding to a phase value that synchronized the PN code of the apparatus with an immediately preceding one of the received packets.

16. The apparatus of claim 15 in which the searching means are adapted to switch from the wide-range search mode to the narrow-range search mode in response to detection of a phase value synchronizing the PN code of the apparatus with a currently received packet and to switch from the narrow-range search mode to the wide-range search mode whenever a predetermined period of time has expired following detection of a phase value synchronizing the PN code of the apparatus with a received packet.

17. The apparatus of claim 15 in which each of the packets comprises an predetermined indicator in a trailing portion of the packet and in which the searching means are adapted to confirm detection of the phase value synchronizing the PN code of the apparatus with the currently received packet in both the wide-range search and narrow-range search modes by decoding at least a portion of the currently received packet with the PN code phase-shifted to the synchronizing phase value and detecting the indicator in the decoded packet portion.

18. The apparatus of claim 17 in which the searching means are adapted to switch from the wide-range search mode to the narrow-range search mode in response to detection of the indicator in a received packet and to switch from the narrow-range search mode to the wide-range search mode whenever a predetermined period of time has expired from detection of the indicator.

19. The apparatus of claim 15 in which:

the means for selecting different phase values are adapted at least in the wide-range search mode to select different subsets of phase values, each subset comprising a plurality of different phase values;

the means for producing phase-shifted PN codes are adapted at least in the wide-range search mode to produce a set of phase-shifted PN codes simultaneously in response to each currently selected subset of phase values, each phase-shifted PN code of the set of phase-shifted PN codes corresponding to a different phase value of the currently selected subset of phase values;

the means for combining the phase-shifted PN codes with a currently received one of the packets to produce signals are adapted at least in the wide-range search mode to combine each of the phase-shifted PN codes of the current set of phase-shifted PN codes with the currently received network packet to produce simultaneously a corresponding set of signals.

20. A polled local area network comprising:

network stations including a base station and a plurality of polled stations polled by the base station;

each of the network stations comprising
  a. means for generating a PN code common to the network stations,
  b. means for encoding and transmitting packets through air, the encoding means including means for direct sequence spread spectrum encoding each packet prior to transmission with the PN code of the network station;
  c. means for receiving and decoding each packet transmitted through air to the network station and direct sequence spread spectrum encoded with the PN code, the receiving and decoding means comprising means for adjusting the phase of the PN code of the network station to a phase value which synchronizes the PN code of the network station with the received packet and means for combining the phase-adjusted PN code with the received packet to spread spectrum decode the received packet, the phase adjusting means comprising means for searching for phase values synchronizing the PN code of the network station with the received packet;

the searching means of each of the polled stations being adapted to search in either a wide-range search mode or a narrow-range search mode for a phase value synchronizing the PN code of the polled station with polling packets transmitted by the base station and spread spectrum encoded with the PN code of the base station, the searching means of each of the polled stations comprising means for
  a. selecting different phase values for the PN code of the polled station from a set of phase values;
  b. producing phase-shifted PN codes corresponding to the PN code of the polled station shifted in phase according to each of the selected phases;
  c. combining the phase-shifted PN codes with a currently received polling packet to produce signals each corresponding to a different phase value selected from the set of phase values;
  d. detecting from the signals a phase value synchronizing the PN code of the polled station with the currently received polling packet;

the searching means of each of the polled stations being adapted in the wide-range search mode repeatedly to select the different phases values for the PN code of the polled station from a relatively exhaustive set of phase values;

the searching means of each of the polled stations being adapted in the narrow-range search mode to select the different phases values for the PN code of the polled station from a restricted set of phase values having predetermined upper and lower bounds corresponding to a phase value that synchronized the PN code of the apparatus with an immediately preceding one of the polling packets received by the polled station;

the searching means of each of the polled stations being adapted to switch from the wide-range search mode to the narrow-range search mode in response to detection of a phase value synchronizing the PN code of the polled station with a polling packet and to switch from the narrow-range search mode to the wide range search mode whenever a predetermined period of time has expired from detection of a phase value synchronizing the PN code of the polled station with a polling packet.

21. The local area network of claim 20 in which:

the base station is adapted to insert into a trailing portion of each polling packet prior to encoding and transmission by the base station an indicator identifying the packet as a polling packet;

the searching means of each polled station are adapted in both the wide-range and narrow-range search modes to confirm detection of the phase value synchronizing the PN code of the polled station with the currently received polling packet by decoding at least a portion of the currently received polling packet by combining the packet portion with the PN code of the polled station phase-shifted according to the synchronizing phase value and detecting the indicator in the decoded packet portion.

22. The local area network of claim of claim 20 in which:

the base station is adapted to direct sequence spread spectrum encode each polling packet with the PN code of the base station phase-shifted according to a predetermined constant phase value of the base station;

each polled station is adapted to direct sequence spread spectrum encode each response packet of the polled station with the PN code of the polled station set at the phase value which synchronized the PN code of the polled station with the corresponding polling packet;

the searching means of the base station are adapted to search for phase values synchronizing the PN of the base station with each response packet transmitted by the polled stations, the searchings means of the base station comprising means for:
  a. setting predetermined upper and lower bounds for a restricted set of phase values corresponding to the predetermined phase value;
  b. selecting different phase values for the PN code of the base from the restricted set;
  c. producing phase-shifted PN codes corresponding to the PN code of the base station shifted in phase according to each of the selected phase values;
  d. combining the phase-shifted PN codes of the base station with the response packet to produce signals each corresponding to a different selected phase value;
  e. detecting from the signals a phase value which synchronizes the PN code with the response packet.

23. A polled local area network comprising:

network stations including a base station and a plurality of polled stations;

each of the network stations comprising a. means for generating a PN code common to the network stations,
b. means for encoding and transmitting packets through air, the encoding means including means for direct sequence spread spectrum encoding each packet prior to transmission with the PN code of the network station;
c. means for receiving and decoding each packet transmitted through air to the network station and direct sequence spread spectrum encoded with the PN code, the receiving and decoding means comprising means for adjusting the phase of the PN code of the network station to a phase value which synchronizes the PN code of the network station with the received packet and means for combining the phase-adjusted PN code with the received packet to spread spectrum decode the received packet, the phase adjusting means comprising means for searching for phase values synchronizing the PN code of the network station with the packet;

the base station being adapted to direct sequence spread spectrum encode each polling packet transmitted by the base station with the PN code of the base station phase-shifted according to a predetermined phase value;

each polled station being adapted to direct sequence spread spectrum encode each response packet of the polled station with the PN code of the polled station set at a phase value which synchronized the PN code of the polled station with the corresponding polling packet received by the station;

the searching means of the base station being adapted to search for phase values synchronizing the PN code of the base station with response packets generated by the polled stations, the searching means of the base station comprising means for:
a. setting upper and lower bounds for a restricted set of phase values corresponding to the predetermined phase value of the base station used to encode the polling packet corresponding to the response packet;
b. selecting different phase values for the PN code of the base station from the restricted set;
c. producing phase-shifted PN codes corresponding to the PN code of the base station shifted in phase according to each of the selected phase values;
d. combining the phase-shifted PN codes of the base station with the response packet to produce signals each corresponding to a different selected phase value;
e. detecting from the signals a phase value which synchronizes the PN code of the base station with the response packet.

* * * * *